(12) United States Patent
Foster

(10) Patent No.: US 7,298,714 B2
(45) Date of Patent: Nov. 20, 2007

(54) PEER-TO-PEER MESSAGE CHAINING FOR INITIATING A DATA EXCHANGE WITH A SERVER

(75) Inventor: Marcus Foster, Kent (GB)

(73) Assignee: Yahoo! Inc., Sunnyvale, CA (US)

( * ) Notice: Subject to any disclaimer, the term of this patent is extended or adjusted under 35 U.S.C. 154(b) by 234 days.

(21) Appl. No.: 11/243,166

(22) Filed: Oct. 4, 2005

(65) Prior Publication Data

US 2007/0076646 A1    Apr. 5, 2007

(51) Int. Cl.
*H04Q 7/20* (2006.01)
*H04Q 7/38* (2006.01)

(52) U.S. Cl. .................. 370/315; 370/310; 370/328; 370/329; 370/338; 370/343; 455/11.1; 455/426.1; 455/426.2; 455/445; 455/422.1; 455/403; 455/500; 709/201; 709/202; 709/203; 709/206; 709/207; 709/208

(58) Field of Classification Search ........... 370/315, 370/310, 328, 329, 338, 343; 455/445, 412.1, 455/412.2, 466, 462, 426.1, 426.2, 414.1, 455/414.2, 414.3, 422.1, 403, 414.4, 450, 455/452.1, 455, 11.1, 500, 517, 509, 512, 455/518, 519, 550.1; 709/201, 202, 203, 709/206, 207, 208, 209, 238
See application file for complete search history.

(56) References Cited

U.S. PATENT DOCUMENTS

2002/0143855 A1* 10/2002 Traversat et al. ........... 709/202
2005/0114262 A1* 5/2005 Howard et al. ............... 705/40
2006/0256728 A1* 11/2006 Li et al. ..................... 370/248

\* cited by examiner

*Primary Examiner*—Keith Ferguson
(74) *Attorney, Agent, or Firm*—Darby & Darby PC; Jamie L. Wiegand

(57) ABSTRACT

A system and method are directed towards enabling a server to activate a plurality of peer devices. The server may send a notification to a first peer device and employ subsequent peer devices to send further notifications to other peer devices in a sequence of peer devices, thereby reducing a number of notifications sent by the server. The peer devices may be mobile devices. In one embodiment, the notification indicates that data is available for download to the peer devices. In one embodiment, the sequence is dynamically determined by the server. In one embodiment, an instruction to send a notification to another peer device is provided to a peer device in the sequence along with the downloaded data. In another embodiment, the instruction is provided with the notification. In one embodiment, a notification may be sent using a hidden message mechanism of Short Message Service (SMS), or the like.

22 Claims, 9 Drawing Sheets

PEER-TO-PEER MESSAGE CHAINING FOR INITIATING A DATA EXCHANGE WITH A SERVER

FIELD OF THE INVENTION

The present invention relates generally to network communications, and more specifically, but not exclusively, to providing notifications to a plurality of devices by sending a notification to a first device and using each subsequent device in a sequence of devices to send a further notification to another device in the sequence.

BACKGROUND OF THE INVENTION

Networked computing devices are typically configured to communicate with other devices to obtain or provide information and/or services. Typically, a client application may run on a local device and request information or a service from another device, such as a server. In some cases, the server may provide a notification indicating that information may be available for the local device from the server. For example, email notification daemons may be employed to asynchronously notify a mail client running on the local device of the arrival of email that may be subsequently retrieved from a mail server.

More recently, mobile devices, such as mobile telephones, pagers, mobile personal data assistants (PDAs), or other wireless and handheld devices, have employed messaging technologies such as Multi-media Messaging Service (MMS), Short Messaging Service (SMS), Instant Messaging (IM), and the like, to request and receive information or services over a network. Such messaging technologies may also be used to provide an alert regarding an occurrence of an event.

Messages are often employed to communicate notifications to mobile devices. However, it can be expensive to communicate large numbers of messages to mobile devices in part because each message may be separately charged to a data provider. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following detailed description, which is to be read in association with the accompanying drawings, wherein.

DETAILED DESCRIPTION OF THE INVENTION

Figure 1:
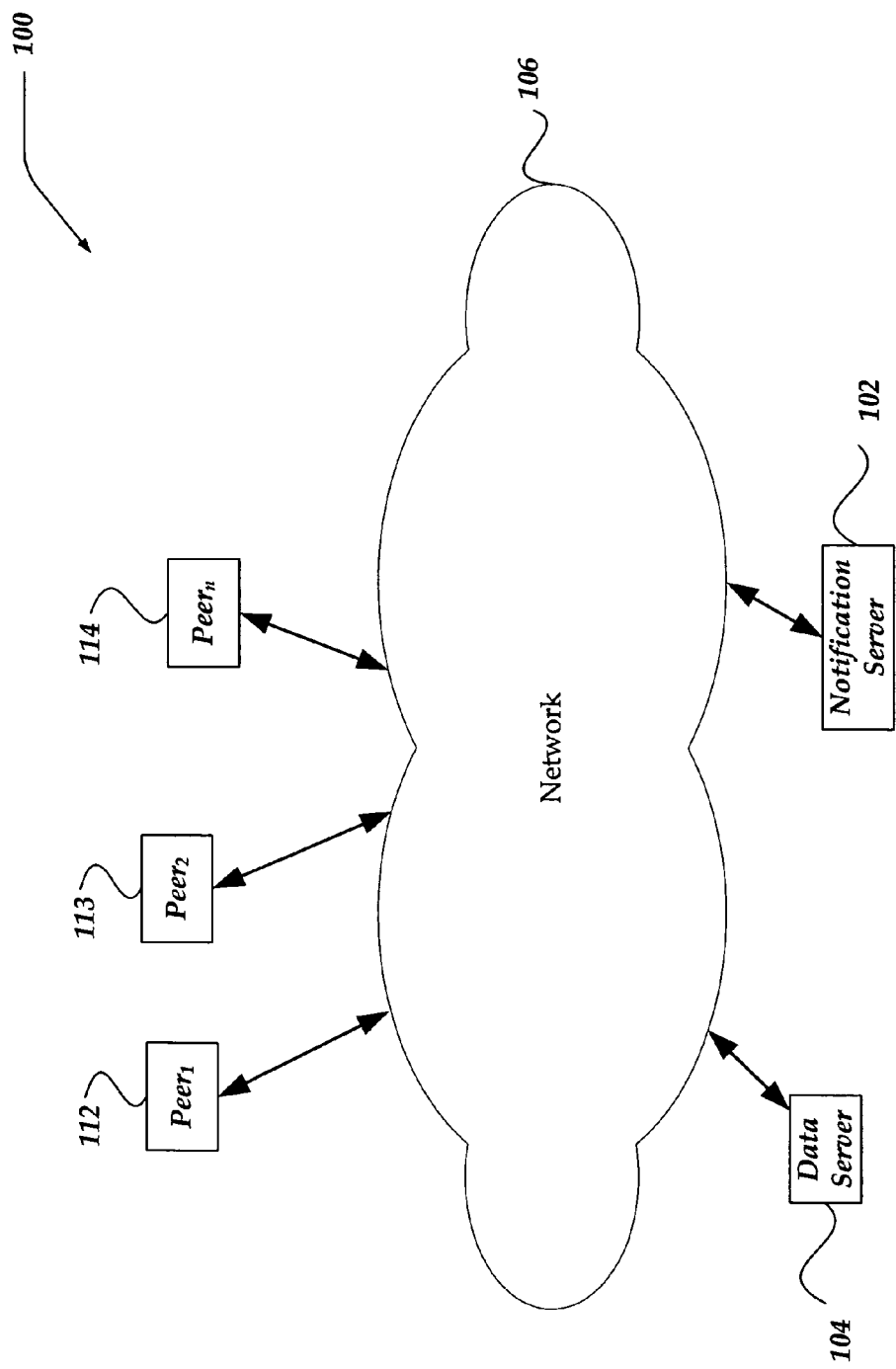
FIG. 1 is a diagram that illustrates one embodiment of an environment for practicing the invention.

In the following detailed description, reference is made to the accompanying drawings, in which are shown exemplary embodiments of the invention. These embodiments are described in sufficient detail to enable those having skill in the art to practice the invention, and it is understood that other embodiments may be utilized, and other changes may be made, without departing from the spirit or scope of the invention. The following detailed description is, therefore, not to be taken in a limiting sense, and the scope of the invention is defined only by the appended claims.

Throughout the specification and claims, the following terms take the meanings explicitly associated herein, unless the context clearly dictates otherwise. The phrase "in one embodiment" as used herein does not necessarily refer to the same embodiment, though it may. The phrase "in another embodiment" as used herein does not necessarily refer to a different embodiment, although it may. As used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

Briefly stated, the present invention is directed toward enabling a server to activate a plurality of devices by sending a notification to a first device and employing subsequent devices to send further notifications to other devices in a sequence, or chain, of devices. In one embodiment, the devices are arranged as peer devices to each other device in the sequence such that each device is enabled to relay messages between each other device. In one embodiment, the devices are mobile devices.

In one embodiment, the notification indicates that information, such as an application update is available for download, a message is available for access, or the like. Notification may also include, for example, event-based notifications, application wakeup messages, update or data availability messages, or the like. In general, a notification may alert a device, or a client application running on the device, of an occurrence of an event associated with the availability of information, enabling the device to initiate a data connection to the server to download the information. For example, a device may be notified of the availability of email, an instant message, a news report, sports score, stock price, weather forecast, updated personalized data for synchronization to the device such as a change to an address book, or the like.

The sequence of devices may be determined by the server. In one embodiment, the sequence is dynamically determined. That is, an ordering of devices may be selected dynamically based on a variety of criteria, including, but not limited to, a characteristic of a device, a capacity of a device, an ordering that is directed towards minimizing a number of messages that may be sent from the server, or the like. Moreover, the sequence may be dynamically updated by the server to manage such issues as broken links in the chain that may arise due to a variety of reasons, including when a device is inaccessible, fails to send a notification to a next device, or the like. In addition, in one embodiment, the sequence need not be completely determined prior to sending a notification to a device.

For example, in one embodiment, the first device and a next device in the sequence may be initially determined. Subsequent devices in the sequence may be determined after the notification process begins. Thus, in one embodiment, selection of a next device in the sequence may be made concurrently with, or prior to, sending of a notification to a device in the sequence.

In one embodiment, the first device in the sequence may be notified by the server to initiate the notification sequence. The first device may then provide a notification to a next device in the sequence, which may then provide a notification to a subsequent device in the sequence, and so forth. In one embodiment, a last device in the sequence may send a message to the server indicating completion of the notification sequence. By employing the present invention, a plurality of devices may receive a notification, with the server merely providing the first notification. This approach may reduce the number of notifications sent by the server, and thereby may reduce costs to a data provider, or the like.

A device in the sequence of devices may receive an instruction that directs the device to send a notification to another device. In one embodiment, the instruction may be provided to the device along with data that the device may download from the server. In another embodiment, the instruction to send a notification to another device may be included along with the notification received by the device.

In one embodiment, the notifications may be sent using SMS's hidden message mechanism. Such hidden message mechanisms enable a computing device to send a message virtually without a user of the computing device being aware that the message is being sent. Thus, the sending of the message may be considered to be hidden from the user of the sending device. In one embodiment, the hidden message may be sent without a user input, an indication to the user via a user interface, or the like. In another embodiment, a receipt of a hidden message may also be hidden from the user of the receiving device. That is, the receipt of the hidden message may not be displayed on a user interface. Thus, in one embodiment, a computing device may receive a notification and send a notification to another device virtually hidden from a user of the computing device. However, in one embodiment, the user may still be provided an indication of a presence of downloaded information, such as an email message, update to an application, or the like.

The invention is not limited, however, to SMS hidden message mechanism, and other hidden or automated message mechanisms may also be employed. For example, IM messages, MMS messages, or the like, may also be used, without departing from the scope or spirit of the invention.

With respect to embodiments that employ SMS capabilities for mobile devices, the invention may provide advantages due to pricing practices for SMS messaging. Mobile phone contracts may include a substantial periodic allowance of free SMS messages. Moreover, inexpensive bundles of SMS messages (typically in the hundreds or thousands) may be available for purchase from network operators, Internet Service Providers (ISPs), or the like. Economies may thus be achieved by enabling mobile device users to pay for one another's notifications at their own cost; a cost may be lower than the cost of sending each message from the notification server to a device, whether the data provider bears that cost or passes it on to the device users. A device user is effectively able to "trade in" messages by allowing notifications to be sent from the user's mobile device to other devices in return for notifications being sent to the user, most likely from another user's mobile device. It is contemplated that in embodiments of the invention the use of a peer device to relay a notification to another peer device may be in accordance with an explicit grant of permission by the user of the device to the central data provider.

Illustrative Operating Environment

FIG. 1 shows components of an exemplary environment in which the invention may be practiced. Not all the components shown may be required to practice the invention, and variations in the arrangement and type of the components may be made without departing from the spirit or scope of the invention.

As shown in the figure, environment 100 may include network 106, notification server 102, data server 104, and peer devices 112-114. Network 106 enables communication between data server 104, notification server 102, and peer devices 112-114.

One embodiment of a peer device is described below in conjunction with FIG. 3. Briefly, however, peer devices 112-114 may include virtually any computing device that is configured to receive and to send information over a network, such as network 106. Moreover, peer devices 112-114 are configured to employ a peer-to-peer messaging mechanism that enables them to, among other things, receive, and/or relay messages to another peer device.

Such devices may include portable devices such as, cellular telephones, smart phones, display pagers, radio frequency (RF) devices, infrared (IR) devices, Personal Digital Assistants (PDAs), handheld computers, wearable computers, tablet computers, integrated devices combining one or more of the preceding devices, and the like. Peer devices 112-114 may also include other computing devices, such as personal computers, multiprocessor systems, microprocessor-based or programmable consumer electronics, network PCs, and the like. As such, peer devices 112-114 may range widely in terms of capabilities and features. For example, a peer device configured as a cell phone may have a numeric keypad and a few lines of monochrome LCD display on which only text may be displayed. In another example, a web-enabled peer device may have a touch sensitive screen, a stylus, and several lines of color LCD display in which both text and graphics may be displayed. Moreover, the web-enabled peer device may include a browser application enabled to receive and to send wireless application protocol messages (WAP), and/or wired application messages, and the like. In one embodiment, the browser application is enabled to employ HyperText Markup Language (HTML), Dynamic HTML, Handheld Device Markup Language (HDML), Wireless Markup Language (WML), WMLScript, JavaScript, EXtensible HTML (xHTML), Compact HTML (CHTML), and the like, to display and send a message.

Peer devices 112-114 also may include at least one client application that is configured to receive content from another computing device. The client application may include a capability to provide and receive textual content, graphical content, audio content, alerts, messages, notifications, and the like. Moreover, peer devices 112-114 may be further configured to communicate a message, such as through a Short Message Service (SMS), Multimedia Message Service (MMS), instant messaging (IM), internet relay chat (IRC), mIRC, Jabber, Enhanced Messaging Service (EMS), text messaging, Smart Messaging, Over the Air (OTA) messaging, or the like, between another computing device, and the like.

In one embodiment, peer devices 112-114 may be configured to send and to receive a hidden message using such as an SMS hidden message mechanism, or the like. Such hidden messages may, for example, be sent or received by peer devices 112-114 virtually without a user action. Moreover, such hidden messages may be virtually hidden from a user, such that an alert, or other indication, might not be provided to a user interface on the peer device when the message is being sent and/or received.

Peer devices 112-114 may also include at least one client application that is configured to initiate a network connection with another computing device, such as data server 104, another peer device, or the like, and to retrieve information from the other computing device. In one embodiment, the initiation of the network connection, and/or the retrieval of the information, may be performed virtually transparent to, or hidden from, the user of the peer device. In one embodiment, peer devices 112-114 may receive from data server 104 an instruction that directs it to send a notification to another peer device, using such as an SMS hidden message mechanism, or the like. In one embodiment, the instruction may be provided to peer devices 112-114 along with the data that is downloaded by the peer device. In another embodiment, information about the next peer device to which a notification is to be sent may be provided by data server 104, notification server 102, or even another peer device. In one embodiment, which peer device to send the notification may be provided as part of a notification from a prior peer device in the sequence of peer devices.

In one embodiment, peer devices 112-114 may enable a user to operate the computing device to make requests for data and/or services from other computers on the network. Often, the requested data resides in computing devices such as data server 104, or the like. Thus, in this specification, the term "client" refers to a computer's general role as a requester of data or services, and the term "server" refers to a computer's role as a provider of data or services. In general, it is possible that a computer can act as a client, requesting data or services in one transaction and act as a server, providing data or services in another transaction, thus changing its role from client to server or vice versa.

Network 106 is configured to couple one computing device with another computing device. Network 106 may be enabled to employ any form of computer readable media for communicating information from one electronic device to another. Also, network 106 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link.

Network 106 may further include any of a variety of wireless sub-networks that may further overlay stand-alone ad-hoc networks, and the like, to provide an infrastructure-oriented connection. Such sub-networks may include mesh networks, Wireless LAN (WLAN) networks, cellular networks, and the like. Network 106 may also include an autonomous system of terminals, gateways, routers, and the like connected by wireless radio links, and the like. These connectors may be configured to move freely and randomly and organize themselves arbitrarily, such that the topology of network 106 may change rapidly.

Network 106 may further employ a plurality of access technologies including 2nd (2G), 2.5, 3rd (3G), 4th (4G) generation radio access for cellular systems, WLAN, Wireless Router (WR) mesh, and the like. Access technologies such as 2G, 3G, and future access networks may enable wide area coverage for mobile devices, such as one or more of peer devices 112-114, with various degrees of mobility. For example, network 106 may enable a radio connection through a radio network access such as Global System for Mobile communication (GSM), General Packet Radio Services (GPRS), Enhanced Data GSM Environment (EDGE), Wideband Code Division Multiple Access (WCDMA), CDMA2000, and the like. Network 106 may also be constructed for use with various other wired and wireless communication protocols, including TCP/IP, UDP, SIP, SMS, RTP, WAP, CDMA, TDMA, EDGE, UMTS, GPRS, GSM, UWB, WiMax, IEEE 802.11x, and the like. In essence, network 106 may include virtually any wired and/or wireless communication mechanisms by which information may travel between one computing device and another computing device, network, and the like.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Data server 104 includes virtually any network device that may be configured to determine an availability of information for access by another computing device, such as peer devices 112-114, and to provide such information to the other computing device. Devices that may operate as data server 104 includes personal computers, desktop computers, multiprocessor systems, microprocessor-based or programmable consumer electronics, network PCs, servers, or the like.

In one embodiment, data server 104 may be configured to operate as a file server. However, data server 104 is not limited to merely a file server, and may also operate as a messaging server, a File Transfer Protocol (FTP) server, a web server, a database server, application server, or the like. Additionally, while data server 104 may operate as other than a file server, it may still be enabled to receive and to send an SMS communication, IM communication, MMS, IM, IRC, mIRC, Jabber, EMS communication, or the like. In one embodiment, data server 104 may be configured to provide data, including, at least a portion of an application, email, text message, a file, or the like, using a hidden message mechanism, such as an SMS hidden message.

In one embodiment, data server 104 may determine that data is available for access by one or more peer devices 112-114. Data server 104 may then provide a list of the one or more peer devices to notification server 102. Notification server 102 may then determine a notification sequence based, in part, on the received list. Data server 104 may further provide to notification server 102 information indicating what type of data are available for access by the one or more peer devices. In one embodiment, data server 104 may also provide one or more notifications to notification server 102 where at least a portion of them used to determine at least a portion of a notification sequence.

In one embodiment, data server 104 may receive information from notification server 102 indicating which peer device is next in a sequence of peer devices. In one embodiment, the notification sequence may be determined, at least in part, from a list provided by data server 104. The received information may enable data server 104 to provide an instruction to a peer device that directs the peer device to send a notification to a next peer device in the notification sequence. In one embodiment, data server 104 may provide the instruction to the peer device along with data that the peer device has requested for download. In another embodiment data server 104 may provide information indicating which peer device is the next peer device to be notified.

Figure 2:
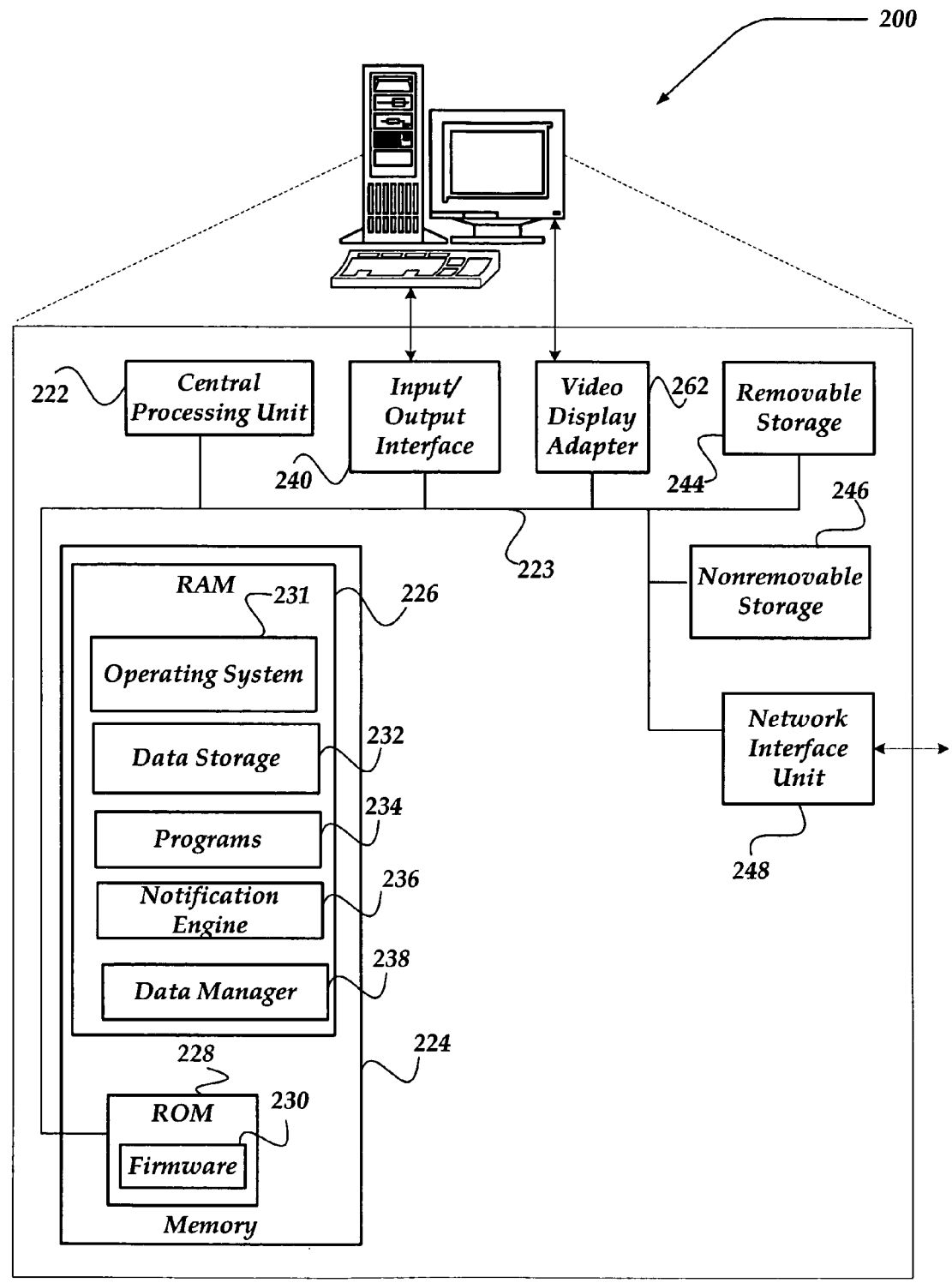
FIG. 2 shows one embodiment of a server device that may be included in a system implementing the invention.

One embodiment of a device suitable for use as notification server 102 is illustrated in FIG. 2. Briefly, however, notification server 102 includes any network device that is configured to determine a notification sequence for peer devices, such as peer devices 112-114. Such devices include, but are not limited to, personal computers, desktop computers, multiprocessor systems, microprocessor-based or programmable consumer electronics, network PCs, servers, or the like.

Notification server 102 may select a first peer device from a plurality of peer devices to send a notification. The notification may indicate, for example, that information, data, an application update, or the like, is available for download by the peer device. Such information may be accessed by peer device, for example, from data server 104, or the like.

Notification server 102 may further determine at least a portion of the sequence of peer devices for which notifications are to be sent. In one embodiment, notification server 102 may dynamically determine at least a portion of the sequence, based on a variety of criteria, including, but not limited to, an availability of a peer device, a characteristic of a peer device, or the like. Notification server 102 may also determine the sequence of peer devices such that a minimum number of notifications might be sent from notification server 102, data server 104, or the like. Moreover, at least a portion of the sequence may be determined prior to sending a notification to a first peer device in the sequence.

Notification server 102 may provide at least a portion of the sequence of peer devices to data server 104. In one embodiment, notification server 102 may provide information about one or more peer devices in the sequence initially to data server 104. Notification server 102 may then provide, at another time, additional information about other peers in the sequence to data server 104. In another embodiment, notification server 102 may provide information indicating an entire sequence of peer devices to data server 102. In still another embodiment, notification server 102 may provide dynamic updates to the sequence of peer devices to data server 104. In one embodiment, notification server 102 may receive information about a peer device, including its availability from another peer device, data server 104, or the like. Notification server 102 may also receive a message from a last peer device in the sequence, confirming completion of the notification sequence.

Although notification server 102 and data server 102 are illustrated as distinct devices in FIG. 1, the invention is not so limited. For example, notification server 102 may be distributed across a plurality of network device, integrated within data server 102, or the like. Similarly, data server 102 may also be distributed across a plurality of network devices. For example, different network devices may be employed depending upon a type of information to be provided, or the like.

Illustrative Server Environment

FIG. 2 shows one embodiment of a network device, according to one embodiment of the invention. Network device 200 may include many more or less components than those shown. The components shown, however, are sufficient to disclose an illustrative embodiment for practicing the invention. Network device 200 may represent, for example, notification server 102 of FIG. 1. Moreover, in one embodiment, network device 200 may also represent data server 104 of FIG. 1 or even an integrated notification server and data server.

As shown in FIG. 2, network device 200 includes at least one central processing unit 222 in communication with main memory 224 by way of bus 223 or the like. Main memory 224 generally includes RAM 226, ROM 228, and may include other storage means, such as one or more levels of cache (not shown). Main memory 224 illustrates a type of processor-readable media, namely computer storage media. Computer storage media may include volatile and nonvolatile, removable and non-removable media implemented in any method or technology for storage of information, such as processor-executable instructions, data structures, program modules, and the like. Other examples of computer storage media include EEPROM, flash memory or other semiconductor memory technology, CD-ROM, DVD or other optical storage media, magnetic tape, magnetic disk storage or other magnetic storage devices, or any other medium that can be used to store the desired information and that can be accessed by a computing device.

Network device 200 includes an input/output interface 240 for communicating with input/output devices, such as a keyboard, mouse, printer, and the like. A user of network device 200 may use input/output devices to interact by way of a user interface that may be separate from or integrated with operating system 231 and/or programs 234. Interaction with the user interface may include interaction by way of a visual display, using video display adapter 242.

Network device 200 may include secondary storage for storage of program modules, data, and the like not in main memory 224, including removable computer-readable storage 244 and/or non-removable computer-readable storage 246. Removable storage 244 may comprise one or more of optical disc media, floppy disks, and magnetic tape readable by way of an optical disc drive, floppy disk drive, and tape drive, respectively. Secondary storage may also include flash memory or other memory technology and generally includes any medium usable for storage of information and accessible by a computing device.

By way of network interface unit 248, network device 200 may communicate with a WAN, such as the Internet, a LAN, a wired telephone network, a wireless communications network, or some other communications network, such as network 106 of FIG. 1. Network interface unit 244 may comprise a transceiver, a network interface card, and the like. Network interface unit 244 is sometimes known as a transceiver, transceiving device, or network interface card (NIC).

Main memory 224 typically stores firmware 230 for boot-loading and controlling low-level operation of network device 200. Main memory 224 also stores programs for loading and execution by central processing unit 222, such as operating system 231 and other programs 234, which may include, for example, server applications, client applications, networking applications, messaging applications such as applications for SMS communication, and the like. Main memory 224 may further include data storage 232, notification engine 236, and data manager 238.

Data storage 232 may include virtually any mechanism that is arranged to store and manage data, such as information associated with a peer device, at least a portion of a notification sequence, or the like. Such mechanisms include, but are not limited to a file, a document, a spreadsheet, a database, or the like. Such stored information associated with a peer device, may include, for example, a characteristic of the peer device, including what application may be on the peer device, a version of the application, a capability of the peer device, an availability of the peer device, whether a user of the peer device has opted in/out of a notification 'trade in' contract, or the like.

Data storage 232 may also be configured to store and manage information, content, or the like, that may be accessed by a peer device, such as peer devices 112-114 of FIG. 1. As such, in one embodiment network device 200 may be configured to operate, at least in part, as data server 104 of FIG. 1.

Notification engine 236 is configured to determine a sequence of peer devices for which a notification is to be sent. Such notification sequence may be determined dynamically, such that at least a portion of the sequence is either incomplete, or changes, as notifications are sent to peer devices within the sequence. As stated above, notification engine 236 may determine the sequence based on a variety of criteria. Moreover, notification engine 236 may change the sequence based on information it may receive from a data server, data manager 238, or the like. In one embodiment, notification engine 236 may employ information about a peer device to determine at least a portion of the sequence of peer devices in the notification sequence.

Notification engine 236 may provide at least a portion of the notification sequence to a data server, such as data server 104 of FIG. 1, data manager 238, or the like. In one embodiment, notification engine 236 may further provide at least a portion of the notification sequence to at least one peer device in the notification sequence. Notification engine 236 may initiate the notification sequence, in part, by sending a notification to a first peer device in the notification sequence. In one embodiment, the notification is sent to the peer device using an SMS hidden message mechanism. However, the invention is not so limited, and other messaging mechanisms may be employed without departing from the scope or spirit of the invention.

In one embodiment, instructions to send a notification to a next peer device in the notification sequence may be provided with a notification received from a prior peer device in the notification sequence. Thus, for example, notification engine 236 may provide information about at least a portion of the notification sequence to a peer device. As an example, notification engine 236 may provide to a first peer device in the notification sequence information that includes addresses for at least a portion of the notification sequence, and instructions that may direct the first peer device to send a notification to a second peer device as identified in at least the portion of the notification sequence. The instructions may further instruct the first peer device to instruct the second peer device to send a notification to an identified third peer device, and so forth. In this manner, data manager 238, data server 104 of FIG. 1, or the like, might send less notification instructions, by sending packaged subsets of the notification sequence with the instructions. In one embodiment, such packaged subsets may also be provided by data manager 238, rather than or in addition to, notification engine 236. In another embodiment, a packaged subset may be provided with the downloaded information.

Notification engine 236 may determine the notification sequence based, at least in part, on information provided by data server 104 of FIG. 1, data manager 238, or the like. Notification engine 236 may receive information indicating that information is available for one or more peer devices. In one embodiment, the information received includes which peer devices may receive the available information. In another embodiment, the information includes a description of the available information. Notification engine 236 may then determine which peer devices may receive the available information. In yet another embodiment, notification engine 236 receives a plurality of notifications associated with peer devices and/or the available information. In this instance, notification engine 236 may then determine a notification sequence based, in part, on the received notifications.

Data manager 238 is further configured to receive a request for information, such as data, at least a portion of an application, update to an application, email, or the like, from a peer device, such as peer devices 112-114 of FIG. 1. Data manager 238 may provide the information to the requesting peer device using any of a variety of mechanisms. In one embodiment, data manager 238 may also send with the provided information a hidden SMS message that instructs the peer device to send a notification to another peer device in the notification sequence.

Figure 3:
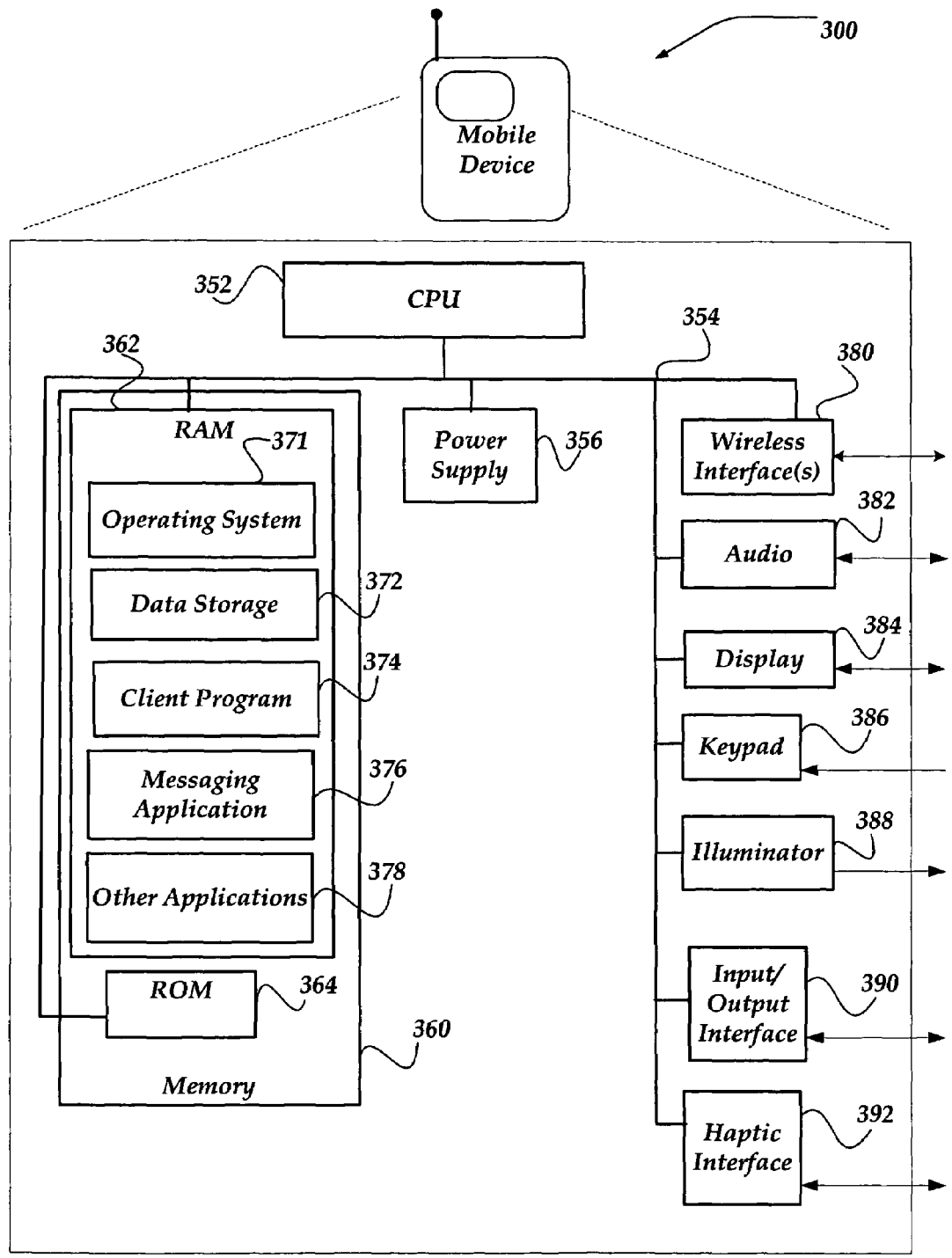
FIG. 3 shows one embodiment of a mobile device that may be included in a system implementing the invention.

FIG. 3 shows one embodiment of a mobile device that may operate as a peer device, such as peer devices 112-114 of FIG. 1. In one embodiment, mobile device 300 is a mobile phone that is arranged to send and receive voice communications, text-based messages, multimedia data, and other data by way of one or more wireless communication interfaces. Generally, mobile device 300 may include any electronic device capable of such wireless communication, including, but not limited to, any personally mobile electronic device. Mobile devices are typically capable of communication by connecting to one or more wireless networks, connecting to multiple nodes of a single wireless network, communicating over one or more channels to one or more networks, or otherwise engaging in one or more communication sessions. Such devices include mobile phones, cellular phones, smart phones, pagers, RF devices, IR devices, integrated devices combining one or more of the preceding devices, and the like. Mobile device 300 may also include other electronic devices such as personal digital assistants, handheld computers, personal computers, microprocessor-based or programmable consumer electronic devices, wearable computers, and the like.

Mobile device 300 may include many more components than those shown in FIG. 3, and need not contain all the components shown therein. However, the components shown are sufficient to disclose an illustrative embodiment for practicing the present invention. As shown in the figure, mobile device 300 includes processing unit 352 in communication with memory 360 by way of bus 354.

Mobile device 300 also includes power supply 356, one or more wireless interfaces 380, audio interface 382, display 384, keypad 386, illuminator 388, input/output interface 390, and haptic interface 392. Power supply 356 provides power to wireless device 350. A rechargeable or non-rechargeable battery may be used to provide power. The power may also be provided by an external power source, such as an AC adapter or a powered docking cradle that supplements and/or recharges a battery.

Mobile device 300 may optionally communicate with a base station (not shown), or directly with another wireless mobile or non-mobile device. Wireless interface 390 includes circuitry for coupling mobile device 300 to one or more wireless networks, and is constructed for use with one or more communication protocols and technologies including, but not limited to, GSM, CDMA, TDMA, EDGE, UMTS, WCDMA, CDMA 2000, UDP, TCP/IP, SMS, GPRS, WAP, UWB, WiMax, IEEE 802.11x, and the like. Audio interface 382 is arranged to produce and receive audio signals, such as the sound of a human voice. For example, audio interface 382 may be coupled to a speaker and microphone (not shown) to enable telecommunication with others and/or to generate an audio acknowledgement for some action. Display 384 may be a liquid crystal display, gas plasma, light emitting diode, or any other type of display used with a mobile device or other wireless device. Display 384 may also include a touch sensitive screen arranged to receive input from an object such as a stylus or a human digit.

Keypad 386 may include any input device arranged to receive input from a user. For example, keypad 386 may include a push button numeric dial or an alphanumeric keyboard. Keypad 386 may also include command buttons that are associated with selecting and sending images. Illuminator 388 may provide a status indication and/or provide light. Illuminator 388 may remain active for specific periods of time or in response to events. For example, if illuminator 388 is active, it may backlight the buttons on keypad 386 and remain active while mobile device 300 is powered. Also, illuminator 388 may backlight these buttons in various patterns if particular actions are performed, such as dialing another mobile device. Illuminator 388 may also cause light sources positioned within a transparent or translucent case of mobile device 300 to illuminate in response to actions.

Mobile device 300 also includes input/output interface 390 for communicating with external devices. Input/output interface 390 may employ one or more appropriate communication technologies, such as USB, IR, Bluetooth, and the like. Haptic interface 392 is arranged to provide tactile feedback to a user of mobile device 300. For example, haptic interface 392 may be employed to vibrate mobile device 300 in a particular way when a user of another device, such as a mobile phone, is calling mobile device 300.

Memory 360 may include RAM 362, ROM 364, and other storage means. Memory 360 also provides data storage 372 and storage of programs, including, for example, operating system 371, client program 374, messaging application 376, and other applications 378. Such programs may include processor-executable instructions which, when executed on mobile device 300, cause transmission, reception, and other processing of audio data, video data, text messaging data, web pages, WML pages, and the like, and enable wireless communication with another device.

Messaging application 376 is configured to receive and to send messages, including notifications. In one embodiment, messaging application 376 may receive and/or send notifications using a hidden message mechanism, such as described above.

Messaging application 376 may further enable mobile device 300 to operate as a peer device using any of a variety of peer-to-peer messaging protocols. For example, messaging application 376 may employ a peer-to-peer messaging protocol that enables mobile device 300 to receive and/or relay messages to other peer devices.

Messaging application 376 may further receive information indicating that content, such as an update to an application, at least a portion of an application, an email, or the like, is available for access by mobile device 300. In one embodiment messaging application 376 may, in part, establish a network connection with a data server, such as data server 104 of FIG. 1 to access the content. In one embodiment, the connection, and/or the access of the content may be performed virtually transparent to a user of mobile device 300.

Generalized Operation

Figure 4:
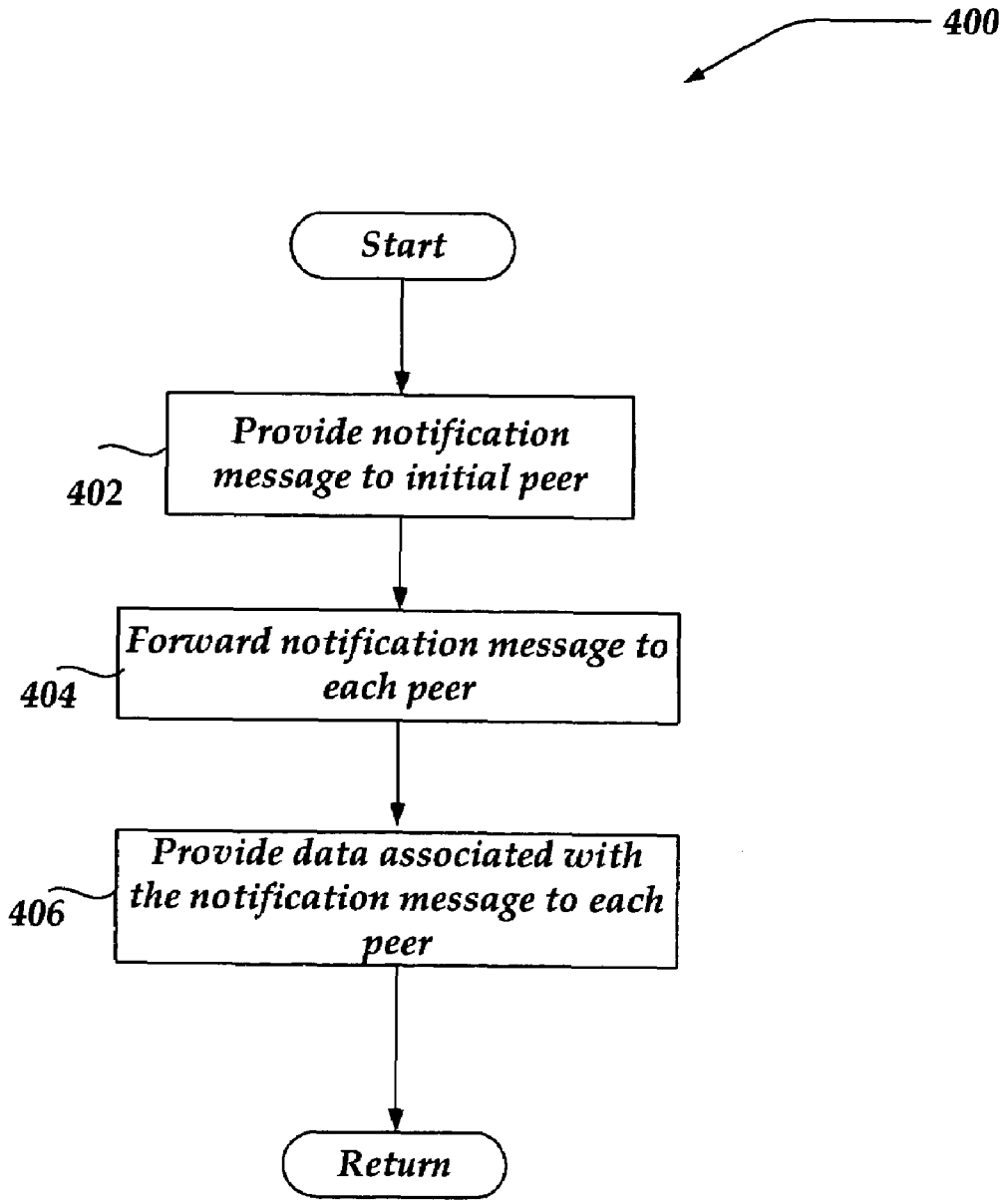
FIG. 4 illustrates a logical flow diagram generally showing one embodiment of a process for providing notifications to a plurality of peer devices.

The operation of certain aspects of embodiments of the invention will now be described with reference to FIGS. 4-7. FIG. 4 is a logical flow diagram generally showing an overview of one embodiment of a process for providing notifications to a plurality of peer devices. Process 400 may be performed, for example, by notification server 102 and/or data server 104 of FIG. 1.

Process 400 is entered when it is determined that one or more notifications are to be sent to a sequence of peer devices (the notification sequence). When it is so determined, process 400 begins, following a start block, at block 402, where a notification is provided to the initial peer device in a sequence of peer devices. In one embodiment, the notification is provided as a hidden SMS message to the initial peer device.

Processing flows next to block 404, where a notification is forwarded to each subsequent peer in the notification sequence. Each notification for subsequent peer devices may be provided by the previous peer device in the notification sequence. In one embodiment, a subsequent notification may be included with the data provided to a peer device that connects to data server 104 of FIG. 1. An instruction may also be included that instructs the peer device to send a notification to a next peer device in the notification sequence. In one embodiment, the notification may be sent as a hidden SMS message.

In one embodiment, while an initial peer device and a second peer device in the notification sequence may be determined initially, a remainder of the notification sequence may be determined concurrently to providing of notifications, or even in a serial manner. In another embodiment, a portion of a sequence, or the entirety of a sequence, may be determined prior to the sending of the notification to the initial device in the sequence.

Process 400 flows next to block 406, where data associated with a corresponding notification may be provided to each peer device within the notification sequence. Process 400 then returns to a calling process to perform other actions.

Figure 5A:
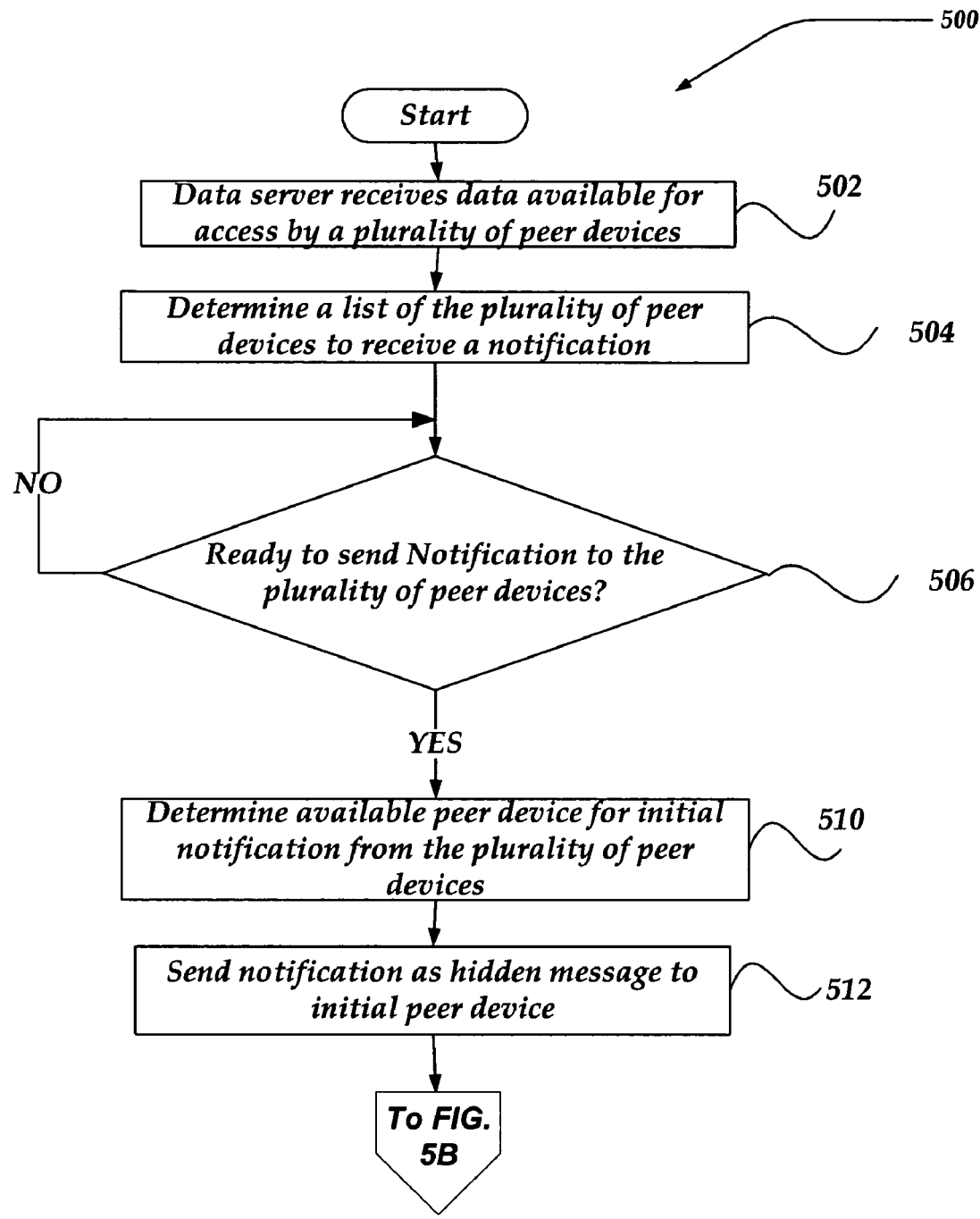
FIG. 5A illustrates a logical flow diagram generally showing one embodiment of a process for providing a notification to an initial peer device in a sequence of devices.
Figure 5B:
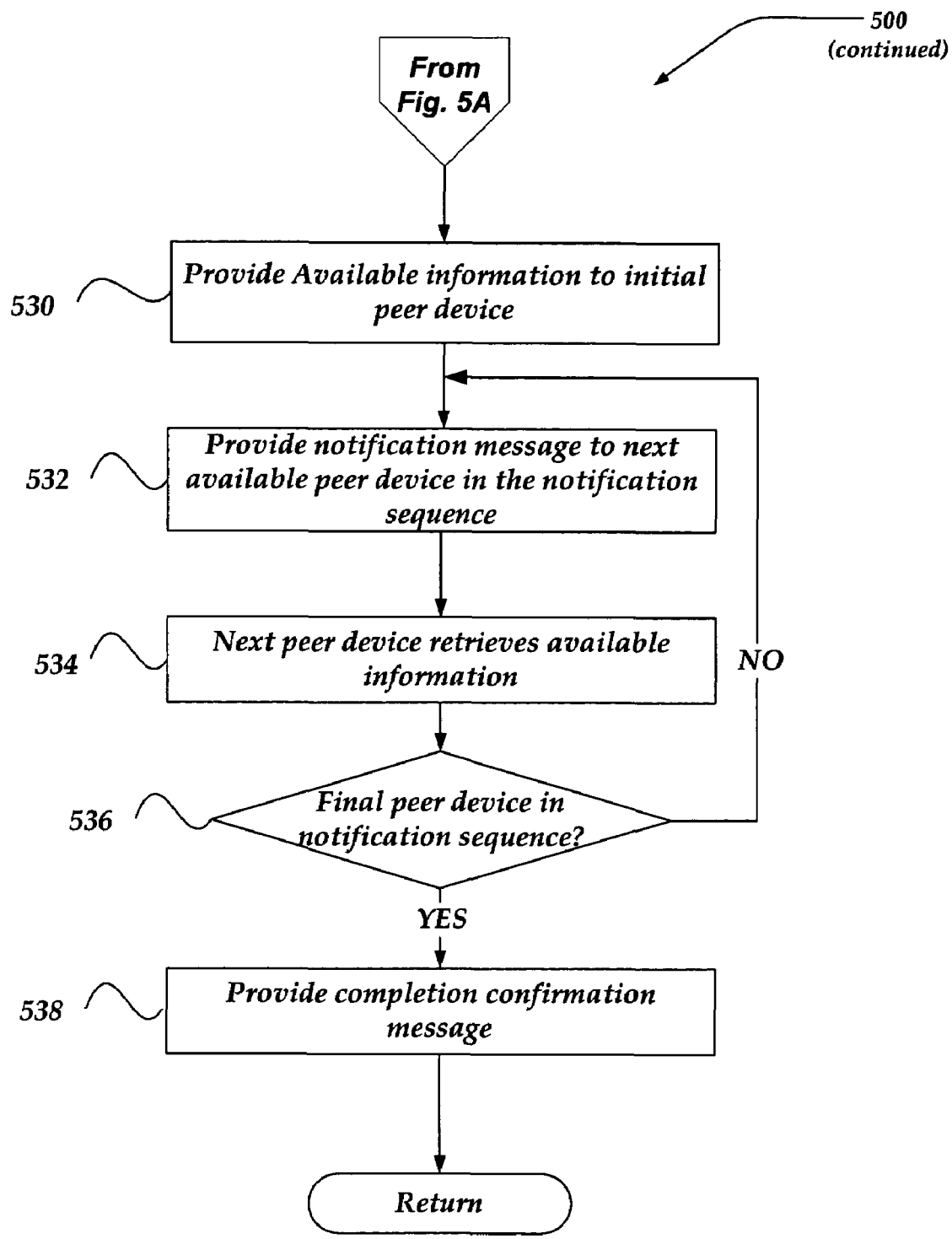
FIG. 5B illustrates a logical flow diagram generally showing one embodiment of a process for providing notifications to subsequent peer devices in a sequence of devices.

FIGS. 5A-5B illustrate a logical flow diagram generally showing one embodiment of a process for providing a notification to peer devices in a sequence of peer devices.

Process 500 begins, after a start block, at block 502, where a data server receives or otherwise determines that there is information for access by a plurality of peer devices. In one embodiment, at least one of the plurality of peer devices is a mobile device. In one embodiment, the information for access is at least one of an application, an update to at least a portion of an application, a message such as an email message or the like, a content item, data, or the like. In one embodiment, the data server may determine that there is a plurality of information that is available for access by the plurality of peer devices. Thus, for example, the data server may determine that an update to at least a portion of an application is available, and an email message is available, or that several updates to applications may be available, or any of a variety of other combinations.

In any event, process 500 next flows to block 504, where a list of the plurality of peer devices may determined that are to receive a notification. In one embodiment, the data server may determine the list of peer devices. In one embodiment, information associated with one or more items available for access also may be provided to a notification server. The notification server may then determine the plurality of peer devices to send the notifications, based, at least in part, on the available information.

Process 500 moves next to decision block 506, where a determination is made whether to send a notification to the plurality of peer devices. Such determination may be based on a variety of criteria, including, but not limited to, whether a threshold number of items are available for access by the plurality of peer devices. The determination may also be based, at least in part, on whether a determined time period has elapsed since receiving the information associated with the one or more items available for access. In still another embodiment, it may be determined that the information available for access includes a high priority item, such as a security update to an application, an urgent email message, or the like. In any event, if it is determined that a notification is to be sent, processing flows to block 510; otherwise, processing may loop back to decision block 506, until it is determined that a notification is to be sent.

At block 510, an available peer device is determined from the plurality of peer devices for which an initial notification is to be sent. Determination of the first peer device to receive the initial notification may be based on a variety of criteria. For example, the first peer device may be based on a cost factor, a distance factor, a contractual agreement, a characteristic of the peer device, a number of items available for access, an availability of the peer device, or the like Moreover, a determination may also be made of a notification sequence for at least a portion of the plurality of peer devices. Such notification sequence may be ordered in such a way as to minimize the number of messages that are sent from the data server. For example, the notification sequence may be based on such criteria as geographic location of the peer devices, wireless networks on which peer devices may be communicating, a user preference regarding how frequently notifications may be provided, a usage limit applicable to the peer devices, or the like.

Process 500 next moves to block 512, where a notification is sent to the selected initial peer device. In one embodiment, the notification is sent using an SMS hidden message mechanism.

Processing next continues to block 530 (of FIG. 5B), where the initial peer device establishes a network connection and downloads the available information. In one embodiment, the initial peer device establishes the network connection with data server 104 of FIG. 1. In one embodiment, the establishment of the network connection, and/or the downloading of the available information may be performed virtually hidden from the user of the peer device.

In one embodiment, the available information includes an instruction to the initial peer device to provide a notification to a next peer device in the notification sequence. Again, the instruction may further indicate that the notification is to be sent as a hidden message, using such as an SMS hidden message mechanism, or the like. In addition, the instruction may include a phone number of the next peer device for transmitting the SMS message or the like. However, the invention is not so limited, and other device identifiers may also be employed, including a Mobile Identification Number (MIN), an electronic serial number (ESN), a network address, or the like.

Processing next steps to block 532, where the notification is provided to the next peer device in the notification sequence in accordance with the provided instruction. As described above, the notification may be provided as a hidden message. Furthermore, in one embodiment, additional information may also be provided to the next peer device that includes at least a portion of the notification sequence. That is, the next peer device may receive, either along with the notification or the downloaded information from block 532, information that may instruct the next peer device to instruct yet another peer device in the notification sequence to send a notification, or the like.

Processing then advances to decision block 536, where it is determined whether this peer device is the final peer device in the notification sequence. If this peer device is not the final peer device, processing loops back to block 532; otherwise, processing flows to block 538.

At block 538, the final peer device may have received an instruction directing it to provide a message to a server such as notification server 102 of FIG. 1 that confirms completion of the notification sequence. In one embodiment, the confirmation message may be sent using such as an SMS hidden message mechanism, or the like. Upon completion of block 538, processing may then return to a calling process to perform other actions.

Although not illustrated in the above process flow, a peer device may be inaccessible for any of a variety of reasons, including, out-of-range, turned-off, an error, or similar failure that may result in its inability to receive and/or to send a notification. However, such situations may be detected using various mechanisms, including, for example, sending a message to the notification server if a peer device does not respond within a period of time, or the like. In any event, if it is determined that a peer device is non-responsive, the notification sequence may be dynamically revised. Such revisions may include dropping the non-responsive peer device, moving the non-responsive peer device into a different ordered position in the notification sequence, or the like.

Figure 6A:
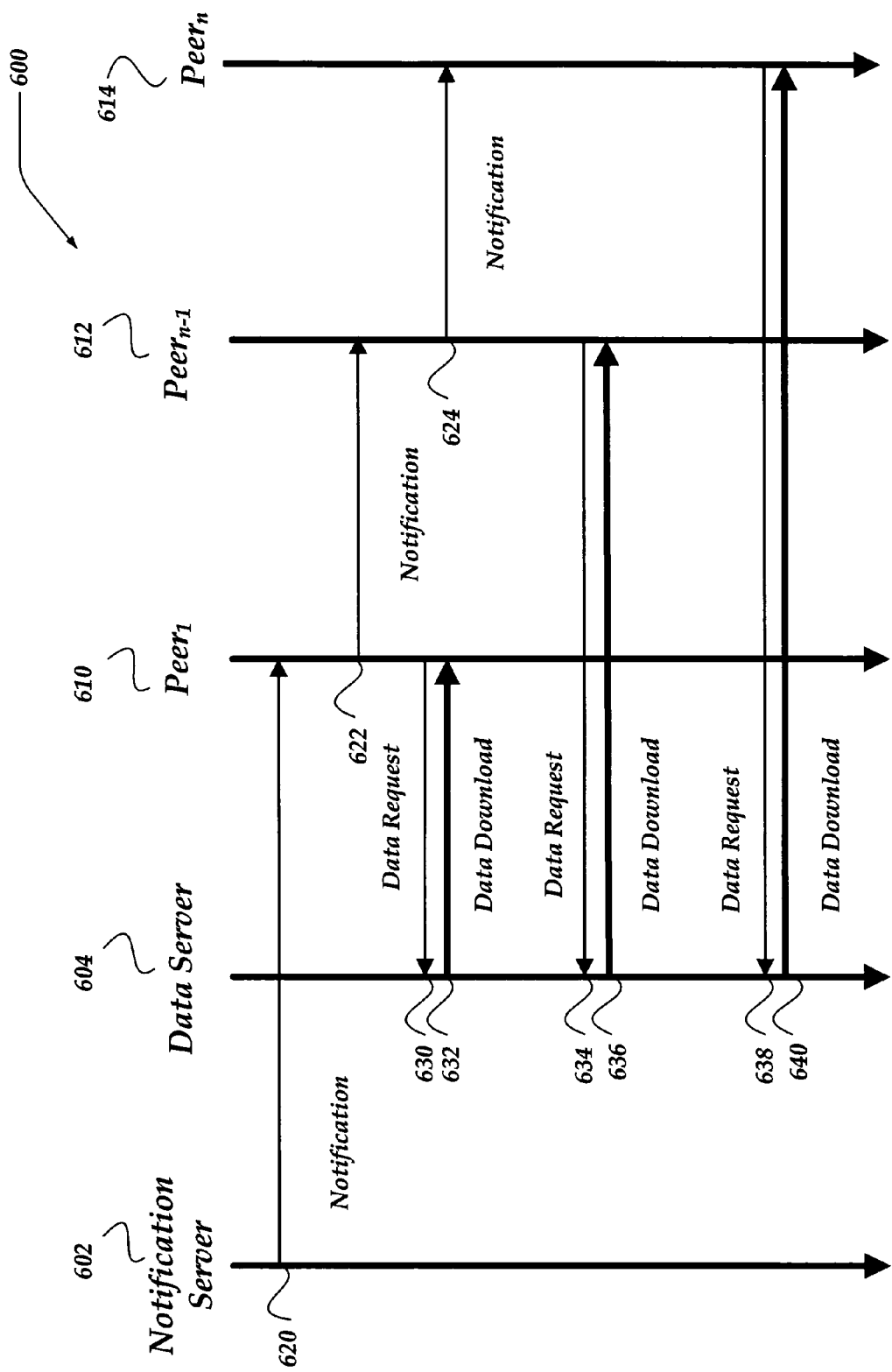
FIG. 6A is a time flow diagram illustrating one embodiment of a process for notifying each device in a determined sequence of peer devices of data retrievable from a data server.

FIG. 6A is a time flow diagram illustrating one embodiment of a process for notifying each peer device in a notification sequence of data retrievable from a data server. In the embodiment, address information for notifying subsequent peer devices in the notification sequence may be included in the notification itself rather than in the data that is downloaded in response to the notification. For example, in one embodiment, the initial notification might include the address and ordering of each peer device in the notification sequence.

Time flow diagram 600 shows notification server 602, data server 604, and a sequence of peer devices 610, 612, and 614. The vertical arrows extending from each device represent a flow of time, while horizontal arrows represent a flow of data from one device to another. An initial notification 620 may be sent by notification server 602 to peer device 610. Notification 620 may inform peer device 610 of the availability of data at data server 604 and may further include an instruction to provide notification 622 to peer device 612, the next peer device in the notification sequence. Peer device 610 may then provide notification 622 to peer device 612.

Next, peer device 610 sends data request 630 to data server 604, which may be followed by data download 632. In one embodiment, substantially in parallel to these events, peer device 612 may send notification 624 to peer device 614, the next and final peer device in the notification sequence, in accordance with instructions that are included with notification 622 and received from peer device 610.

After sending notification 624 to peer device 614, peer device 612 may send data request 634 to data server 604 and receives data download 636. Lastly, peer device 614 may send data request 638 to data server 604 and receive data download 640. Since peer device 614 is the final device in the notification sequence, it may not provide a notification to another peer device. However, in one embodiment, the final peer device in the notification sequence may provide a confirmation message to notification server 602, to indicate that the notification sequence is completed.

Figure 6B:
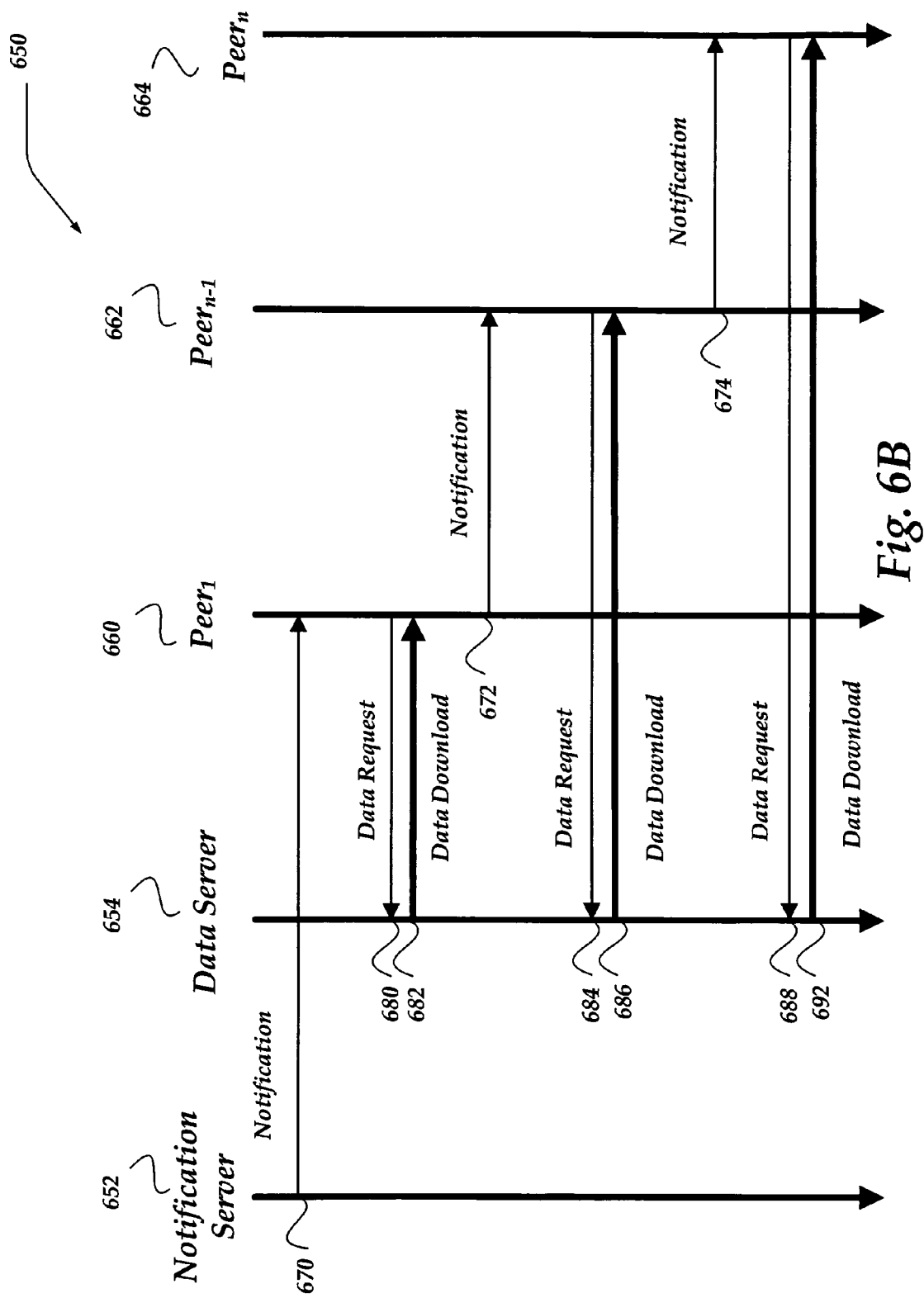
FIG. 6B is a time flow diagram illustrating another embodiment of a process for notifying each device in a determined sequence of peer devices of data retrievable from a data server.

FIG. 6B is a time flow diagram illustrating another embodiment of a process for notifying each device in a determined sequence of peer devices of data retrievable from a data server, in which an instruction to notify a subsequent peer device may be included in the content that is downloaded by a peer device in response to a notification, rather than being included in the notification itself.

In time flow diagram 650, notification server 652 may send notification 670 to peer device 660, the initial peer device in the notification sequence. Peer device 660 then may send data request 680 to data server 654 and receive data download 682. Data download 682 may include an instruction to notify peer device 662, the next peer device in the notification sequence. Accordingly, peer device 660 may send notification 672 to peer device 662. Peer device 662 may then send data request 684 to data server 654 and receives data download 686. In accordance with instructions in the downloaded data, peer device 662 may send notification 674 to peer device 664, the final peer device in the notification sequence. Peer device 664 sends data request 688 to data server 654 and receives data download 692.

Figure 7:
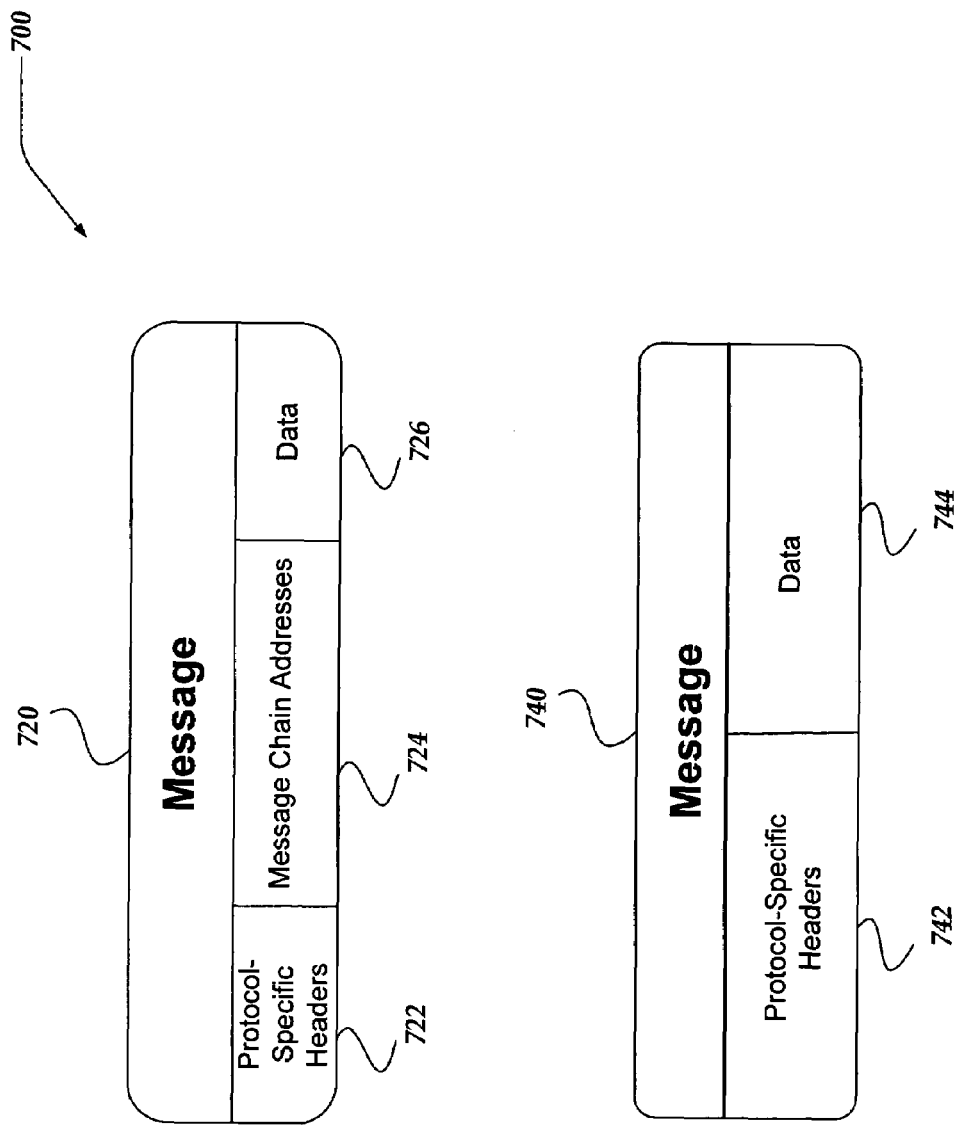
FIG. 7 is a diagram showing two possible notification formats that may be employed in accordance with the present invention.

FIG. 7 is a diagram showing two possible embodiments of notification formats that may be employed. Message 720 may correspond to the approach illustrated in FIG. 6A, while message 740 may correspond to the approach illustrated in FIG. 6B.

Message 720 may include protocol-specific headers 722, one or more message chain addresses 724 for notifying subsequent devices in the notification sequence, and data 726. Protocol-specific headers 722 may include for example information indicating that the message is an SMS message, an IM message, or the like. Protocol-specific headers 722 may also include information indicating that the message is a notification, a hidden message, or the like. In one embodiment, message 720 is a hidden SMS message. Also, as shown in the figure, message 740 includes protocol specific headers 742 and data 744. In one embodiment, message 720 is also a hidden SMS message.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The foregoing specification and examples provide a complete description of the manufacture and use of the composition of the invention. Since many embodiments of the invention can be made without departing from the spirit or scope of the invention, the invention resides in the claims hereinafter appended.

What is claimed as new and desired to be protected by Letters Patent of the United States is:

1. A method for providing data to a plurality of mobile devices, comprising:
   determining a sequence of mobile devices from at least a portion of the plurality of mobile devices;
   selecting a first mobile device from the sequence of mobile devices;
   sending a first notification of an availability of data to the first mobile device; and
   instructing the first mobile device to send another notification of the availability of data to a next mobile device in the sequence.

2. The method of claim 1, wherein sending the first notification or the other notification comprises sending at least one of the first notification or the other notification as a hidden message.

3. The method of claim 1, wherein the sequence is dynamically updated based, at least in part, on an availability of a mobile device in the plurality of mobile devices.

4. The method of claim 1, further comprising:
   instructing the next mobile device to send another notification to another mobile device in the sequence of mobile devices.

5. The method of claim 1, wherein sending the first notification further comprises, including the instruction to send another notification with the first notification.

6. The method of claim 1, instructing the first mobile device further comprises:
   downloading the available data onto the first mobile device; and receiving with the available data the instruction to send the other notification.

7. A server for providing data to a plurality of devices over a network, comprising:
a memory for use in storing data and instructions; and
a processor, in communication with the memory, for use in enabling actions based on the stored instructions, the actions comprising:
determining a sequence of devices from at least a portion of the plurality of devices;
selecting a first device from the sequence of devices;
sending a notification of an availability of data to the first device; and
instructing at least one device in the sequence to send another notification of the availability of data to a next device in the sequence.

8. The server of claim 7, wherein the sequence is based on at least one of a geographic location, a network type, a user preference, or a usage limit.

9. The server of claim 7, wherein the plurality of devices include at least one mobile device.

10. The server of claim 7, wherein at least one of the notification or the other notification is sent using a hidden message mechanism.

11. The server of claim 7, wherein sending the notification or the other notification further comprises sending at least a portion of the sequence of devices with the notification or the other notification.

12. The server of claim 7, where sending the notification or the other notification further comprises sending instructions with the notification or the other notification, wherein the instructions direct at least two devices in the sequence to send notifications.

13. The server of claim 7, wherein at least a portion of the plurality of devices are configured to operate as peer devices.

14. A peer device for enabling data to be provided over a network, comprising:
a memory for use in storing data and instructions; and
a processor in communication with the memory and for enabling actions based on the stored instructions, the instructions arranged to perform actions comprising:
receiving a first notification indicating an availability of data;
receiving the available data;
receiving an instruction to notify another peer device in a sequence of peer devices of the availability of the data; and
sending a second notification to the other peer device, wherein the other peer device is further instructed to send a third notification to a third peer device.

15. The peer device of claim 14, wherein receiving the instruction further comprises receiving the instruction with at least one of the first notification or the available data.

16. The peer device of claim 14, where the sequence of peer devices is determined dynamically based, in part, on an availability of peer devices in a plurality of peer devices.

17. The peer device of claim 14, further comprising:
receiving at least a portion of the sequence of peer devices with at least one of the available data or the first notification; and
receiving a plurality of instructions with the instruction, wherein each of the instructions in the plurality of instructions is configured to direct one of the peer devices in at least the portion of the sequence to send a notification of availability of the data to a subsequent peer device in the sequence.

18. A mobile device for enabling data to be provided over a network, comprising:
a transceiver to send and receive data over the network; and
a component that is programmed to perform actions comprising:
receiving a first hidden notification indicating an availability of data;
accessing the available data; and
providing a second hidden notification to another device that is identified in a sequence of mobile devices, wherein the second notification is based on an instruction that is included with at least one of the first notification or the available data.

19. The mobile device of claim 18, wherein the sequence of mobile devices is dynamically determined by other than the mobile device.

20. The mobile device of claim 18, wherein the available data includes at least one of an electronic mail message, an address book, an instant message, a content item, an update, data for synchronization, or data associated with a remote event.

21. A computer readable storage medium for managing a communication over a network, the computer readable storage medium having computable executable instructions stored thereon wherein stored into a computer device to enable the computer device to perform actions, comprising:
enabling a server to dynamically determine a sequence of devices from at least a portion of a plurality of device for which data is available;
sending, by the server, a hidden notification that data is available to a first device in the dynamic sequence of devices; and
enabling each device in the dynamic sequence to send another hidden notification to a subsequent device in the dynamic sequence of devices.

22. An apparatus for use in communicating an availability of data to a plurality of devices over a network, comprising:
means for determining a notification sequence for devices from at least a portion of the plurality of devices;
means for providing a notification indicating the availability of the data to one of the devices in the notification sequence; and
means for employing subsequent devices in the notification sequence to send further notifications to other devices in the notification sequence.

* * * * *